(12) United States Patent
Bouchard (10) Patent No.: US 8,803,451 B2
(45) Date of Patent: Aug. 12, 2014

(54) MULTIPLEXER CIRCUIT FOR DUAL THERMISTOR OPERATION USING A SINGLE LINE COUPLING

(75) Inventor: Guy P. Bouchard, Beverly, MA (US)

(73) Assignee: OSRAM SYLVANIA Inc., Danvers, MA (US)

( * ) Notice: Subject to any disclaimer, the term of this patent is extended or adjusted under 35 U.S.C. 154(b) by 178 days.

(21) Appl. No.: 13/398,256

(22) Filed: Feb. 16, 2012

(65) Prior Publication Data

US 2013/0214703 A1    Aug. 22, 2013

(51) Int. Cl.
*H05B 37/02* (2006.01)
*H02H 5/04* (2006.01)

(52) U.S. Cl.
USPC ............ 315/309; 315/294; 315/307; 361/106

(58) Field of Classification Search
USPC .......... 315/291, 294, 307, 308, 309; 361/103, 361/106
See application file for complete search history.

(56) References Cited

U.S. PATENT DOCUMENTS

| | | | | |
|---|---|---|---|---|
| 3,315,135 | A | * | 4/1967 | Thiele ........................... 361/159 |
| 4,926,280 | A | * | 5/1990 | Richter et al. .................. 361/15 |
| 6,963,477 | B2 | * | 11/2005 | Ikeda ............................. 361/106 |
| 2011/0298374 | A1 | | 12/2011 | Lenk et al. |

FOREIGN PATENT DOCUMENTS

EP           0207729 A3      1/1987

* cited by examiner

*Primary Examiner* — Tung X Le
(74) *Attorney, Agent, or Firm* — Andrew Martin (57) ABSTRACT

A time-multiplexed thermal sensing circuit is provided for control and sensing of two thermistors over a single line electrical coupling. The circuit may include a first diode that selectively couples or isolates a first thermistor from a sense node based on the polarity of an applied voltage to the sense node. The circuit may further include a second diode that selectively couples or isolates a second thermistor from the sense node based on the polarity of the applied voltage to the sense node such that only of the thermistors is coupled to the sense node at any time.

18 Claims, 5 Drawing Sheets

MULTIPLEXER CIRCUIT FOR DUAL THERMISTOR OPERATION USING A SINGLE LINE COUPLING

TECHNICAL FIELD

The present application relates to time-multiplexed operation of dual thermistors, and in particular, to time-multiplexed operation of dual thermistors using a single line electrical coupling for control and sensing of the thermistors.

BACKGROUND

The development of high-brightness LEDs has led to use of such devices in various applications and lighting fixtures. In general, an LED-based lamp operates in a fundamentally different way than an incandescent, or gas discharge lamp, and therefore may use a driver circuit tailored to deliver power to the LEDs according to their requirements. The driver circuitry for an LED-based lamp generally converts an alternating current (AC) input, such as a 120V/60 Hz line input to a stable direct current (DC) voltage used for driving the LED-based lamp. In some applications, for example automotive applications, the driver circuitry converts a DC input, such as from a 12V battery, to a stable DC voltage at a different level to drive the LED-based lamp.

The LEDs are often mounted on a thermal substrate, which in turn is electrically coupled to the driver circuit that may be located on a separate module. In addition to the mounting circuitry, the thermal substrate may include one or more thermistors used to monitor temperature and provide feedback to the driver for the purpose of limiting or regulating power, and thus temperature, to a desired operational range. In many applications, the connector between the driver module and the thermal substrate is of a pre-defined type or specification and the number of connector pins may be limited. In these cases it can be difficult to accommodate the extra electrical connections that would typically be needed to monitor a second thermistor.

One solution to this problem is to employ an additional, or intermediate, circuit board assembly on the thermal substrate to excite and monitor multiple thermistors and then transmit a composite signal back to the driver module over the single available electrical line to the driver module. This approach, however, suffers from the disadvantages of additional cost, complexity and size.

BRIEF DESCRIPTION OF THE DRAWINGS

Reference should be made to the following detailed description which should be read in conjunction with the following figures, wherein like numerals represent like parts.

DETAILED DESCRIPTION

Generally, this disclosure provides circuits and methods for implementing time-multiplexed operation of dual thermistors over a single electrical line or coupling. The thermistors, along with associated selection circuitry, may be located on a thermal substrate for an LED-based lamp. The multiplexer and sensing circuitry may be located on a separate module along with the LED driver circuit. The electrical coupling between the driver module and the thermal substrate may provide a single line for the purpose of control and sensing of the two thermistors. The selection circuitry on the thermal substrate may include two diodes, each diode associated with one of the thermistors. The diodes may be configured to selectively isolate or couple the associated thermistor to a shared sense node based on the polarity of a control voltage applied to the sense node. The control voltage may be generated by the multiplexer circuitry on the driver module and the sense node may be monitored by the sensing circuitry on the driver module.

Figure 1:
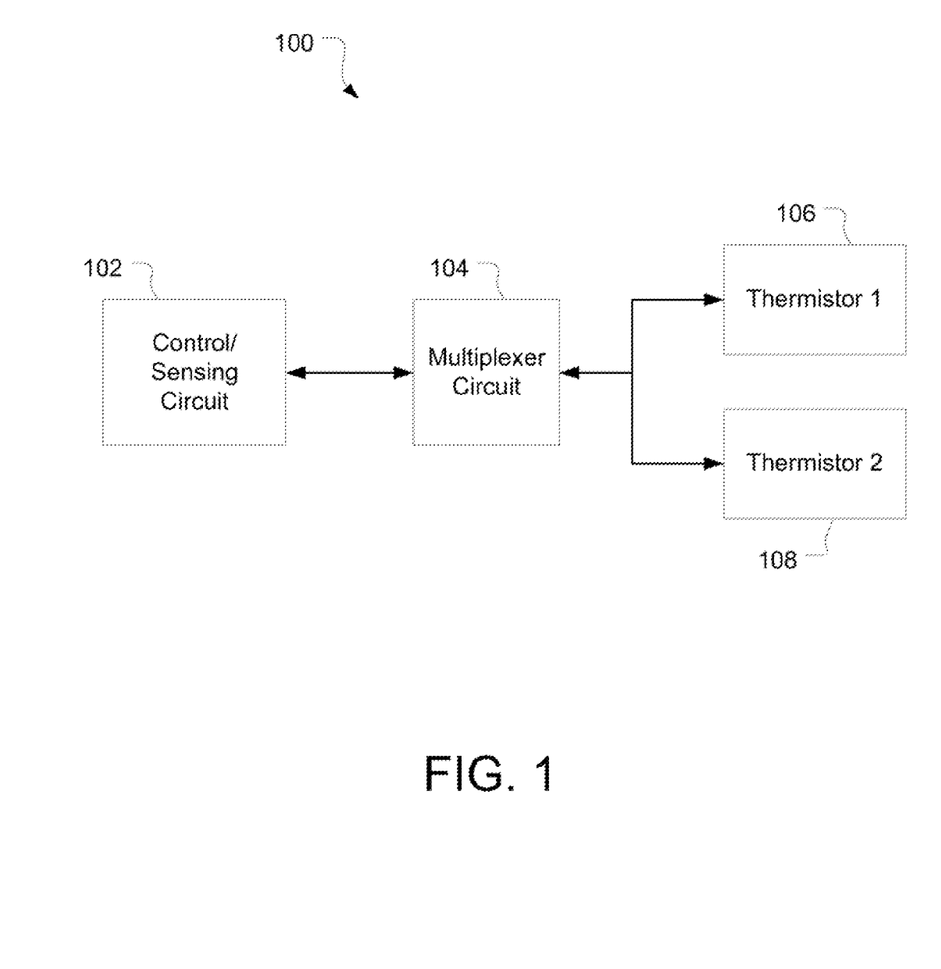
FIG. 1 is a block diagram of one exemplary embodiment of a system consistent with the present disclosure.

Turning now to FIG. 1, there is provided a simplified block diagram of one exemplary embodiment of a system 100 consistent with the present disclosure. In general, the system includes a control/sensing circuit 102 consistent with the present disclosure, for selecting, exciting and sensing thermistors. The control/sensing circuit 102 may be coupled to two thermistors: thermistor 1 106 and thermistor 2 108. The coupling may be achieved through a multiplexer circuit 104 that enables the control/sensing circuit 102 to electrically couple to the thermistors 106, 108 through a single, shared electrical line.

Thermistors are electrical components that exhibit a variable resistance that is dependent on temperature. By exciting a thermistor with a known voltage and then measuring or sensing the current, the resistance of the thermistor may be determined and thus the temperature measured. Alternatively, a known current may be applied and the voltage can be measured to determine the resistance of the thermistor. Some thermistors may have positive temperature coefficients, where the resistance increases as the temperature increases, while other thermistors may have negative temperature coefficients, where the resistance increases as the temperature decreases. Some thermistors operate in a linear mode, where the relationship between resistance and temperature may be linear or approximately linear. Some thermistors exhibit a more complicated relationship between resistance and temperature, in which case a predetermined calibration curve may be employed to determine temperature based on a resistance measurement.

Figure 2:
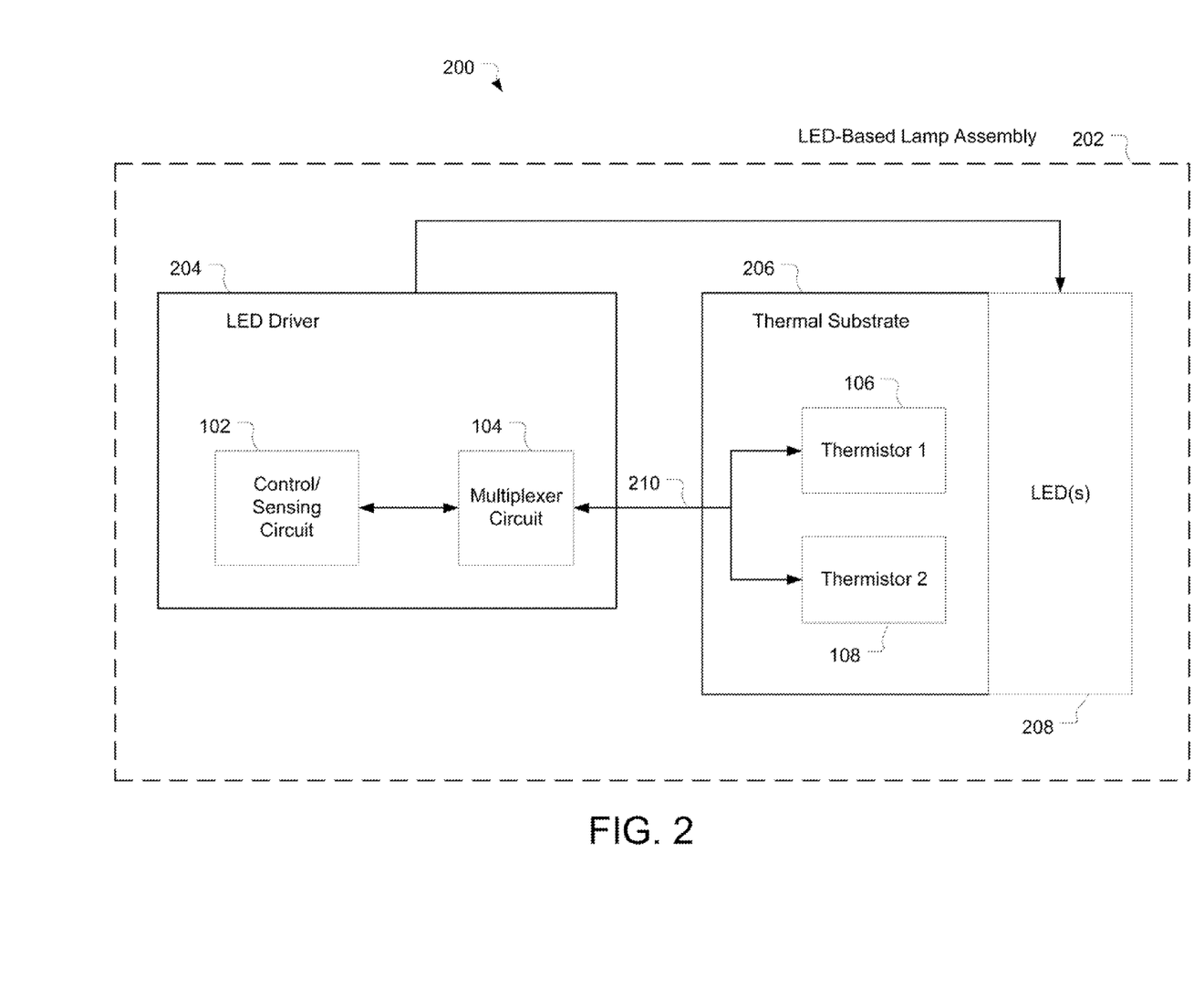
FIG. 2 is a block diagram of another exemplary embodiment of a system consistent with the present disclosure.

FIG. 2 is a block diagram of another exemplary embodiment of a system consistent with the present disclosure. As shown, an LED-based lamp assembly 202 may include an LED driver module 204 and a thermal substrate 206 upon which a number of LED(s) 208 may be disposed. In general, the LED driver module 204 may include circuitry to convert an alternating current (AC) input, such as a 120V/60 Hz line input to a stable direct current (DC) voltage used for driving the LED(s) 208, although other configurations are also possible. The LED driver module 204 may also include the control/sensing circuit 102 and the multiplexer circuit 104. The thermal substrate 206 provides a heat dissipation platform for the LED(s) 208, and may also include circuitry including the thermistors 106 and 108 as well as other components to be discussed in greater detail below. The thermistors 106, 108 may be monitored to determine the temperature of the thermal substrate 206 and/or the LED(s) 208. In some embodiments, the level of power delivered by the LED driver module 204 to the LED(s) 208 may be adjusted based on the monitored temperature to maintain the system within a desired operational temperature range.

The electrical connection between the LED driver module 204 and the thermal substrate 206 may include electrical lines or pins, the number of which may be limited. The multiplexer circuit 104 allows for control and sensing of the two thermistors 106, 108 over a single line or pin 210, as will be described in greater detail below, resulting in a more efficient utilization of a the limited available connections.

Figure 3:
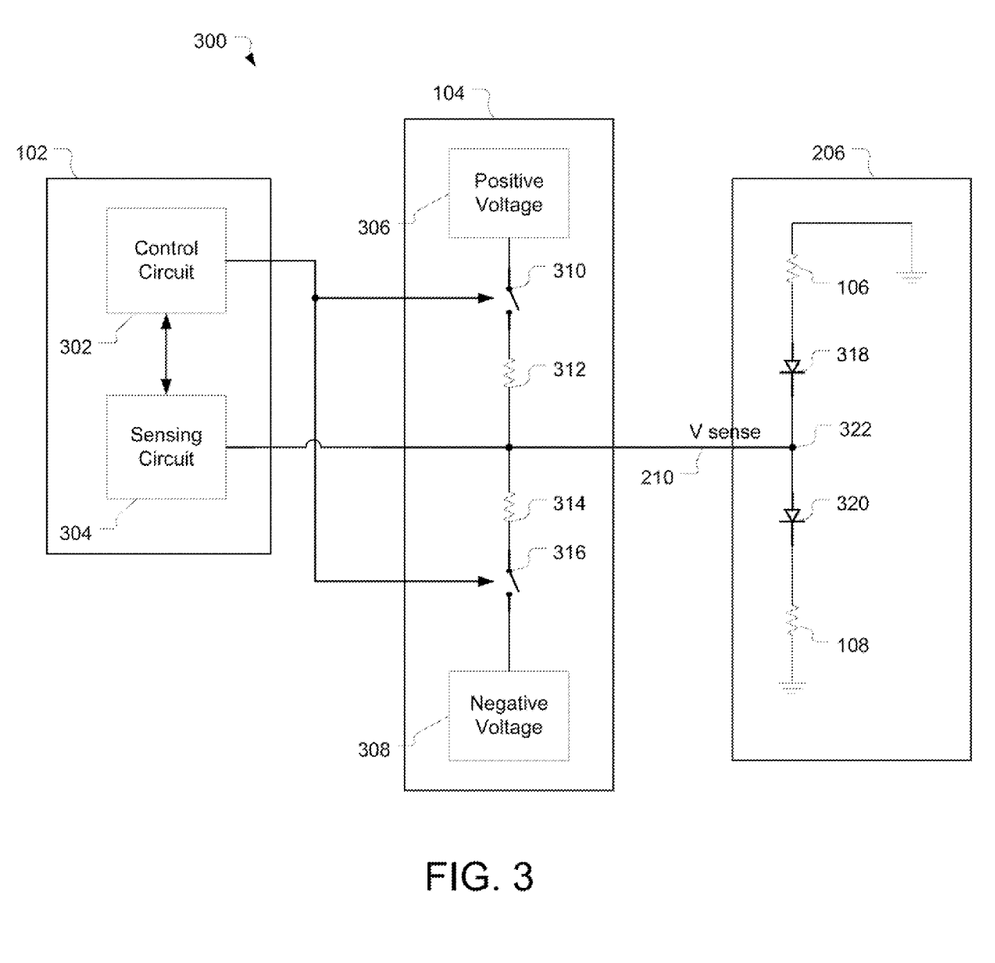
FIG. 3 is a block diagram of one exemplary embodiment of a dual multiplexed thermistor circuit consistent with the present disclosure.

FIG. 3 is a circuit block diagram 300 that conceptually illustrates one exemplary embodiment of a dual multiplexed thermistor circuit consistent with the present disclosure. The control/sensing circuit 102 is shown to include a separate control circuit 302 and a sensing circuit 304 for clarity of description although there is no requirement that these components be separated. In some embodiments, the control circuit 302 and the sensing circuit 304 may be implemented as a microprocessor which may further include an analog-to-digital converter.

Also shown is the multiplexer circuit 104 which includes a positive voltage source 306, a negative voltage source 308 as well as controllable switches 310 and 316 and resistors 312 and 314. In some embodiments, the controllable switches 310 and 316 may be transistors such as, for example, bipolar junction transistors (BJTs) or field effect transistors (FETs). The thermal substrate 206 is also shown to include the thermistors 106 and 108, diodes 318 and 320 and a sense node 322. The multiplexer circuit 104 is coupled to the sense node 322 of the thermal substrate 206 by the single electrical coupling line 210.

The control circuit 302 may be configured to select either of the thermistors 106, 108 for excitation and measurement by selectively coupling either the positive voltage source 306 or the negative voltage source 308 to the sense node 322 by operation of either of the controllable switches 310 or 316 respectively. For example, when the switch 310 is closed (in a conducting state) and the switch 316 is open (in a non-conducting state), a positive voltage may be applied to the sense node 322. Under this condition, the diode 318 may isolate the thermistor 106 from the sense node 322, while the diode 320 may couple the thermistor 108 to the sense node 322, effectively selecting the thermistor 108 for excitation and measurement. In this situation, the resistor 312 and the thermistor 108 may operate as a voltage divider between the positive voltage source 306 and a ground. Measurement of the voltage, $V_{SENSE}$, at the sense node 322 by the sensing circuit 304 allows for the determination of the resistance of the thermistor 108, and thus the temperature associated with the thermistor 108.

Alternatively, when the switch 310 is open (in a non-conducting state) and the switch 316 is closed (in a conducting state), a negative voltage may be applied to the sense node 322. Under this condition, the diode 318 may couple the thermistor 106 to the sense node 322, while the diode 320 may isolate the thermistor 108 from the sense node 322, effectively selecting the thermistor 106 for excitation and measurement. In this situation, the resistor 314 and the thermistor 106 may operate as a voltage divider between the negative voltage source 306 and the ground. Measurement of the voltage, $V_{SENSE}$, at the sense node 322 by the sensing circuit 304 allows for the determination of the resistance of the thermistor 106, and thus the temperature associated with the thermistor 106.

Thus, the selection of a thermistor for excitation as well as the measurement of the selected thermistor, during a given time period, may be accomplished using a single electrical connection, the line 210. In some embodiments, additional pairs of thermistors may be deployed on the thermal substrate 206 and each additional pair of thermistors may be coupled to the multiplexer circuit 104 through a separate additional electrical connection line.

Figure 4:
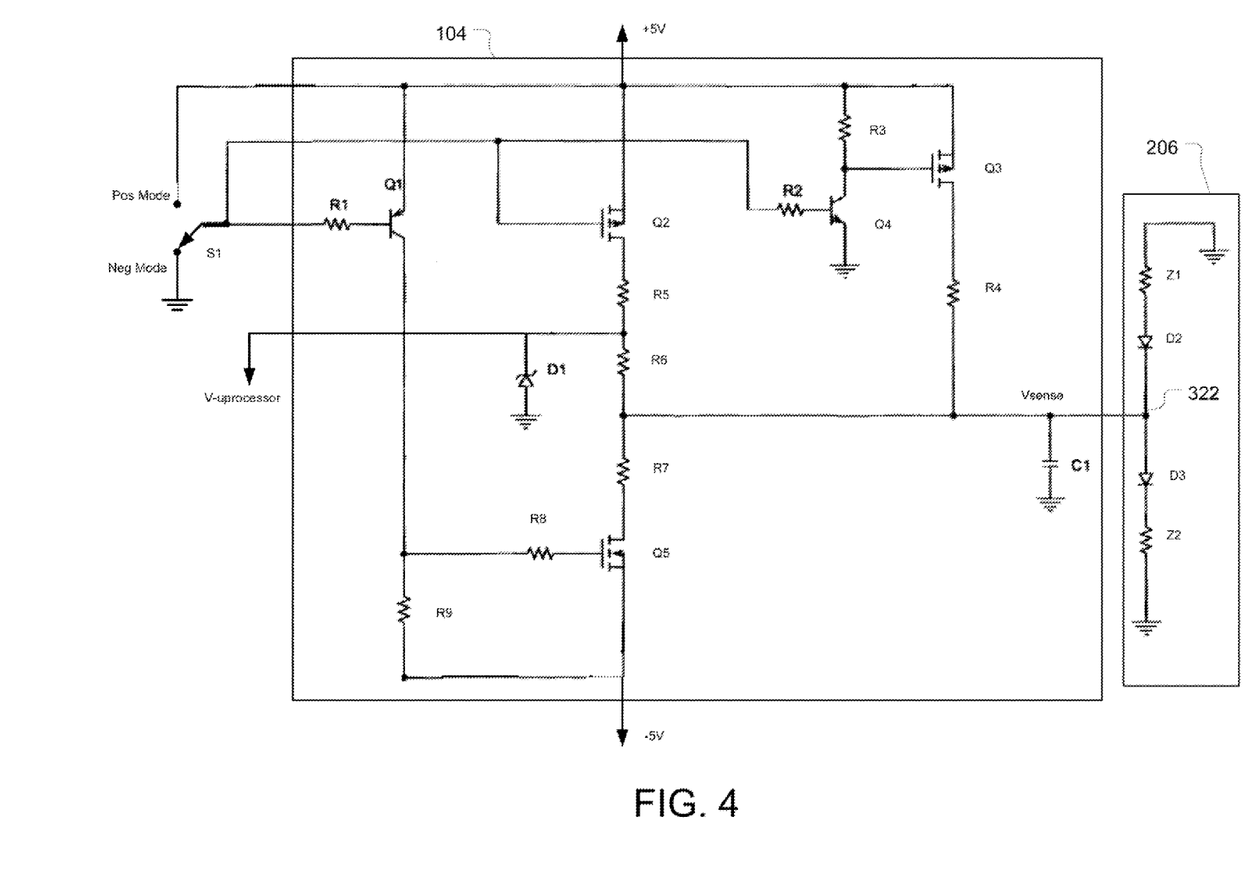
FIG. 4 is a schematic diagram of one exemplary embodiment of a dual multiplexed thermistor circuit consistent with the present disclosure.

FIG. 4 is a schematic diagram of one exemplary embodiment of a dual multiplexed thermistor circuit 400 consistent with the present disclosure. The illustrated exemplary embodiment includes the multiplexer circuit 104, thermal substrate 206, a capacitor C1, diodes D1-D3, transistors Q1-Q5, resistors R1-R9, a switch S1 and thermistors Z1 and Z2. In operation, the control circuit, which in some embodiments may be a microprocessor (not shown), toggles the switch S1 to couple either the +5 volt power rail (for positive mode operation) or the ground (for negative mode operation) to the multiplexer circuit 104 to control the operation of the multiplexer circuit 104 by driving the gates (or bases) of the transistors Q1, Q2 and Q4 either high or low. The control circuit may also measure the voltage at the $V_{UPROCESSOR}$ node. In some embodiments, this may be accomplished with an analog-to-digital converter.

When operating in the positive mode, the base of the transistor Q1 is driven high which switches Q1 into a non-conducting state, which in turn drives the gate of the transistor Q5 low, switching Q5 into a non-conducting state, decoupling resistor R7 from the circuit. The gate of the transistor Q2 is also driven high in the positive mode, switching it into a non-conducting state, which effectively decouples the resistor R5 from the circuit. The base of the transistor Q4 is also driven high which switches Q4 into a conducting state, which in turn drives the gate of the transistor Q3 low and thus switches Q3 into a conducting state. This combination of the transistors Q2 and Q5 in a non-conducting state with the transistor Q3 in a conducting state creates a path from the +5 volt power rail through the resistor R4 to the sense node 322, which applies a positive voltage at the node. The positive voltage at the sense node 322 causes the diode D2 to isolate the thermistor Z1 from the sense node 322 while allowing the diode D3 to couple the thermistor Z2 between the sense node 322 and the ground. This effectively creates a voltage divider R4/Z2 between the +5 volt power rail and the ground. Since the value of the R4 resistor and the value of the forward voltage drop of the D3 diode over the temperature range are known, a measurement of the voltage at the sense node 322 enables a determination of the resistance of the thermistor Z2, and therefore a determination of the associated temperature. Equivalently, the control circuit may measure the voltage at the $V_{UPROCESSOR}$ node, which is coupled to the sense node 322 through the resistor R6 of known value. The value of the thermistor Z2 operating in the positive mode may be estimated as:

$$Z_2 = \frac{R_4 \cdot (V_{UPROCESSOR} - V_{D3})}{5 - V_{UPROCESSOR}}$$

where $Z_{UPROCESSOR} \gg R6$ and $V_{sense} = V_{UPROCESSOR}$

When operating in the negative mode, the base of the transistor Q1 is driven low which switches Q1 into a conducting state, which in turn drives the gate of the transistor Q5 high, switching it into a conducting state. The gate of the transistor Q2 is also driven low in the negative mode, switching it into a conducting state, which creates a series resistance network consisting of the resistors R5, R6 and R7 between the +5 volt power rail and the −5 volts power rail. The base of the transistor Q4 is also driven low which switches Q4 into a non-conducting state which in turn drives the gate of the transistor Q3 high and thus switches Q3 into a non-conducting state. This combination of the transistors Q2 and Q5 in a conducting state with the transistor Q3 in a non-conducting state creates a path from the −5 volt power rail through the resistor R7 to the sense node 322, which applies a negative voltage at the node. The negative voltage at the sense node 322 causes the diode D3 to isolate the thermistor Z2 from the sense node 322 while allowing the diode D2 to couple the thermistor Z1 between the sense node 322 and the ground. This effectively creates a voltage divider R7/Z1 between the −5 volt power rail and the ground. Since the value of the R7 resistor is known, a measurement of the voltage at the sense node 322 enables a determination of the resistance of the thermistor Z1, and therefore a determination of the associated temperature. Equivalently, the control circuit may measure the voltage at the $V_{UPROCESSOR}$ node, which is coupled to the sense node 322 at the junction of the resistors R5 and R6. The resistors R5 and R6 may be operable as a voltage divider configured to bias or level shift the sense node voltage, which is in a negative voltage range, to the $V_{UPROCESSOR}$ node voltage in a positive voltage range that may be more conveniently measured by the control circuit analog to digital converter. The value of the thermistor Z1 operating in the negative mode may be estimated as:

$$Z_1 = \frac{R_7 \cdot (5 - 2 \cdot V_{UPROCESSOR} - V_{D3})}{2 \cdot V_{UPROCESSOR}}$$

for $$0 < V_{UPROCESSOR} < (2.5 - (V_{D3}/2))$$

where $$R5 = R6 \text{ and } R5 \gg R7$$

A dual multiplexed thermistor circuit 400 consistent with the present disclosure may be configured for operation with a variety of input voltages based on appropriate selection of various circuit components thereof. Table 1 below identifies one example of circuit components useful in configuring the embodiment 400 illustrated in FIG. 4 (resistor values in ohms):

TABLE 1

| Component | Descriptor/Value |
|---|---|
| C1 | 10 nF |
| D1 | D1N5229 |
| D2 | D1N4148 |
| D3 | D1N4148 |
| Q1 | Q2N3906 |
| Q2 | TP0610KL |
| Q3 | TP0610KL |
| Q4 | Q2N3904 |
| Q5 | 2N7000 |
| R1 | 39k |
| R2 | 39k |
| R3 | 39k |
| R4 | 2k |
| R5 | 100k |
| R6 | 100k |
| R7 | 1k |
| R8 | 1k |
| R9 | 39k |
| S1 | 2 pole switch |
| Z1 | 10k @ 25° C. |
| Z2 | 10k @ 25° C. |

In a preferred embodiment, the dual multiplexed thermistor circuit 400 has input power rails of +/−5 volts and thermistors Z1, Z2 having negative temperature coefficients.

Figure 5:
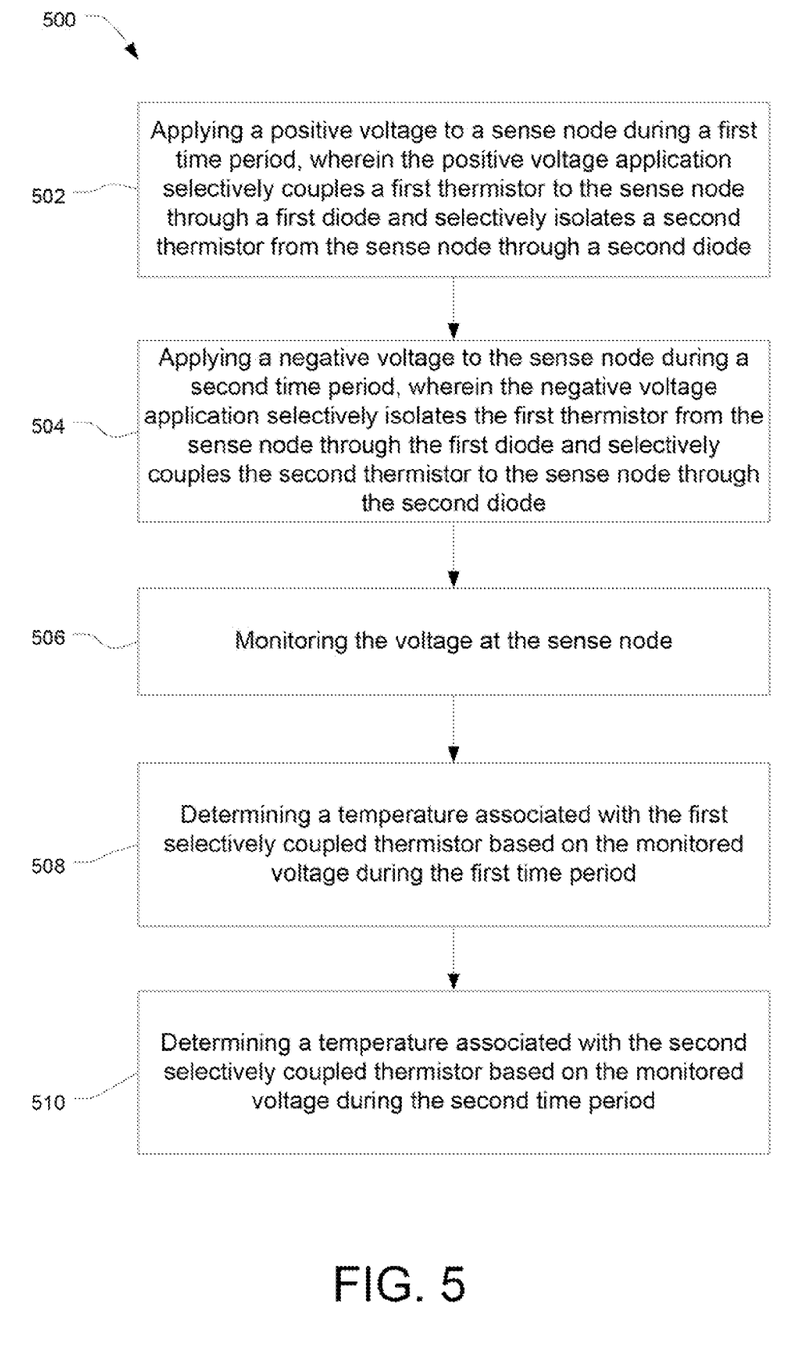
FIG. 5 is a block flow diagram of one exemplary method consistent with the present disclosure.

FIG. 5 is a block flow diagram of one method 500 for controlling and sensing two thermistors consistent with the present disclosure. The illustrated block flow diagram may be shown and described as including a particular sequence of steps. It is to be understood, however, that the sequence of steps merely provides an example of how the general functionality described herein can be implemented. The steps do not have to be executed in the order presented unless otherwise indicated.

In the exemplary embodiment illustrated in FIG. 5, a positive voltage is applied to a sense node during a first time period 502. The positive voltage application selectively couples a first thermistor to the sense node through a first diode and selectively isolates a second thermistor from the sense node through a second diode. A negative voltage is applied to the sense node during a second time period 504. The negative voltage application selectively isolates the first thermistor from the sense node through the first diode and selectively couples the second thermistor to the sense node through the second diode. The voltage at the sense node is monitored 506. A temperature associated with the first selectively coupled thermistor based on the monitored voltage during the first time period is determined 508. A temperature associated with the second selectively coupled thermistor based on the monitored voltage during the second time period is determined 510.

Consistent with the present disclosure, therefore, there are provided circuits and methods for implementing time-multiplexed operation of dual thermistors over a single electrical line or coupling. The thermistors, along with associated selection circuitry, may be located in a thermal substrate for an LED-based lamp. The multiplexer and sensing circuitry may be located on a separate module along with the LED driver circuit. The electrical coupling between the driver module and the thermal substrate may provide a single line for the purpose of control and sensing of the two thermistors.

According to one aspect of the disclosure there is provided a thermal sensing circuit. The thermal sensing circuit includes: a first thermistor; a first diode coupled between the first thermistor and a sense node, the first diode configured to isolate the first thermistor from the sense node in response to a positive voltage applied to the sense node; a second thermistor; and a second diode coupled between the second thermistor and the sense node, the second diode configured to isolate the second thermistor from the sense node in response to a negative voltage applied to the sense node.

According to another aspect of the disclosure there is provided an LED-based lamp assembly including: a thermal substrate comprising a first thermistor, a first diode, a second thermistor and a second diode, the first diode configured to isolate the first thermistor from a sense node in response to a positive voltage applied to the sense node, the second diode configured to isolate the second thermistor from the sense node in response to a negative voltage applied to the sense node; an LED-based light source disposed on the thermal substrate; and a driver circuit configured to drive the LED-based light source, the driver circuit comprising: a control circuit configured to select one of the first thermistor and the second thermistor; a multiplexer circuit configured to apply a control voltage to the sense node, wherein the polarity of the control voltage is based on the control circuit selection; and a sensing circuit configured to monitor the voltage at the sense node and determine a temperature associated with the selected thermistor.

According to another aspect of the disclosure there is provided a method for controlling and sensing thermistors, the method including: applying a positive voltage to a sense node during a first time period, wherein the positive voltage application selectively couples a first thermistor to the sense node through a first diode and selectively isolates a second thermistor from the sense node through a second diode; applying a negative voltage to the sense node during a second time period, wherein the negative voltage application selectively isolates the first thermistor from the sense node through the first diode and selectively couples the second thermistor to the sense node through the second diode; monitoring the voltage at the sense node; determining a temperature associated with the first selectively coupled thermistor based on the monitored voltage during the first time period; and determining a temperature associated with the second selectively coupled thermistor based on the monitored voltage during the second time period.

As used in any embodiment herein, "circuitry" may include, for example, singly or in any combination, hardwired circuitry, programmable circuitry, state machine circuitry, and/or firmware that stores instructions executed by programmable circuitry.

The term "coupled" as used herein refers to any connection, coupling, link or the like by which signals carried by one system element are imparted to the "coupled" element. Such "coupled" devices, or signals and devices, are not necessarily directly connected to one another and may be separated by intermediate components or devices that may manipulate or modify such signals. Likewise, the terms "connected" or "coupled" as used herein in regard to mechanical or physical connections or couplings is a relative term and does not require a direct physical connection.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A thermal sensing circuit, said circuit comprising:
a first thermistor;
a first diode coupled between said first thermistor and a sense node, said first diode configured to isolate said first thermistor from said sense node in response to a positive voltage applied to said sense node;
a second thermistor; and
a second diode coupled between said second thermistor and said sense node, said second diode configured to isolate said second thermistor from said sense node in response to a negative voltage applied to said sense node.

2. A circuit according to claim 1, wherein the anode of said first diode is coupled to a first port of said first thermistor, the cathode of said first diode is coupled to said sense node and a second port of said first thermistor is coupled to a ground.

3. A circuit according to claim 2, wherein the anode of said second diode is coupled to said sense node, the cathode of said second diode is coupled to a first port of said second thermistor and a second port of said second thermistor is coupled to said ground.

4. A circuit according to claim 1, wherein said first thermistor and said second thermistor have negative temperature coefficients.

5. A circuit according to claim 1, wherein said thermal sensing circuit is disposed in a thermal substrate.

6. An LED-based lamp assembly comprising:
a thermal substrate comprising a first thermistor, a first diode, a second thermistor and a second diode, said first diode configured to isolate said first thermistor from a sense node in response to a positive voltage applied to said sense node, said second diode configured to isolate said second thermistor from said sense node in response to a negative voltage applied to said sense node;
an LED-based light source disposed on said thermal substrate; and
a driver circuit configured to drive said LED-based light source, said driver circuit comprising:
a control circuit configured to select one of said first thermistor and said second thermistor;
a multiplexer circuit configured to apply a control voltage to said sense node, wherein the polarity of said control voltage is based on said control circuit selection; and
a sensing circuit configured to monitor the voltage at said sense node and determine a temperature associated with said selected thermistor.

7. An LED-based lamp assembly according to claim 6, wherein said multiplexer circuit and said sensing circuit share a common electrical coupling to said sense node.

8. An LED-based lamp assembly according to claim 6, wherein said driver circuit adjusts power to said LED-based light source based on said determined temperature.

9. An LED-based lamp assembly according to claim 6, wherein said determined temperature is calculated based on pre-determined calibration data, said calibration data relating thermistor voltage and temperature.

10. An LED-based lamp assembly according to claim 6, wherein said sensing circuit comprises a microprocessor.

11. An LED-based lamp assembly according to claim 6, wherein said control circuit comprises a microprocessor.

12. An LED-based lamp assembly according to claim 6, wherein the anode of said first diode is coupled to a first port of said first thermistor, the cathode of said first diode is coupled to said sense node and a second port of said first thermistor is coupled to a ground.

13. An LED-based lamp assembly according to claim 12, wherein the anode of said second diode is coupled to said sense node, the cathode of said second diode is coupled to a first port of said second thermistor and a second port of said second thermistor is coupled to said ground.

14. An LED-based lamp assembly according to claim 6, wherein said first thermistor and said second thermistor have negative temperature coefficients.

15. An LED-based lamp assembly according to claim 6, wherein said sensing circuit monitors said voltage at said sense node biased to a positive voltage range.

16. A method for controlling and sensing thermistors, said method comprising:
applying a positive voltage to a sense node during a first time period, wherein said positive voltage application selectively couples a first thermistor to said sense node through a first diode and selectively isolates a second thermistor from said sense node through a second diode;
applying a negative voltage to said sense node during a second time period, wherein said negative voltage application selectively isolates said first thermistor from said sense node through said first diode and selectively couples said second thermistor to said sense node through said second diode;

monitoring the voltage at said sense node;

determining a temperature associated with said first selectively coupled thermistor based on said monitored voltage during said first time period; and determining a temperature associated with said second selectively coupled thermistor based on said monitored voltage during said second time period.

17. A method according to claim 16, further comprising calculating said determined temperature based on pre-determined calibration data, said calibration data relating thermistor voltage and temperature.

18. A method according to claim 16, further comprising adjusting power to an LED-based light source based on said determined temperature.

* * * * *